(12) United States Patent
Morosi

(10) Patent No.: US 8,668,514 B2
(45) Date of Patent: Mar. 11, 2014

(54) CONNECTING MULTIPLE CONDUITS

(75) Inventor: Justin I. Morosi, Fishers, IN (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 13/252,989

(22) Filed: Oct. 4, 2011

(65) Prior Publication Data

US 2013/0084730 A1      Apr. 4, 2013

(51) Int. Cl.
*H01R 4/50* (2006.01)
(52) U.S. Cl.
USPC ......................................................... 439/348
(58) Field of Classification Search
USPC ................... 439/348, 929; 361/686, 724–727
See application file for complete search history.

(56) References Cited

U.S. PATENT DOCUMENTS

| | | | |
|---|---|---|---|
| 4,516,189 A * | 5/1985 | Seaks, Jr. ........................ | 361/823 |
| 5,176,528 A * | 1/1993 | Fry et al. ........................ | 439/181 |
| 5,629,831 A * | 5/1997 | Eggert et al. ................... | 361/624 |
| 6,449,732 B1 | 9/2002 | Rasmussen et al. | |
| 6,547,569 B1 | 4/2003 | Issan | |
| 6,942,785 B2 * | 9/2005 | Bayer et al. ..................... | 210/91 |
| 6,988,221 B2 | 1/2006 | Rasmussen et al. | |
| 7,099,152 B2 * | 8/2006 | Gasbarro et al. ............ | 361/679.4 |
| 7,797,558 B2 | 9/2010 | Ghoshal | |
| 2002/0090846 A1 | 7/2002 | Abboud | |
| 2004/0031767 A1 * | 2/2004 | Ice .................................. | 211/26 |
| 2008/0109677 A1 | 5/2008 | Rasmussen et al. | |
| 2009/0194226 A1 * | 8/2009 | Tabet ............................. | 156/230 |

FOREIGN PATENT DOCUMENTS

EP          0585548 A1     3/1994

OTHER PUBLICATIONS

Hughes, et al., "BladeCenter midplane and media interface card", IBM Journal of Research and Development, vol. 49, No. 6, pp. 823-836, Nov. 2005.
T.A.C. Schneider Electric, "NetControllerII—CPU Module", www.tac.com/NetControllerII, Jun. 2008.
Andover Controls Corporation, "Continuum—NetController CPU Module", www.andovercontrols.com/NetController, 2000.
Abbott, et al., "Virtual I/O Server Deployment Examples", www.ibm.com/redp4224/redpaper/, Feb. 2007.

* cited by examiner

*Primary Examiner* — Jean F Duverne
(74) *Attorney, Agent, or Firm* — Andrea Bauer; Hoffman Warnick LLC

(57) ABSTRACT

Connector modules have complementary profiles configured for sliding engagement. Modules bearing a first profile may be mounted in series, such as on a rail, on a frame or component. Modules bearing a second profile may similarly be mounted in series, such as on a rail, so that rails bearing modules with the first profile may slide into rails bearing modules with the second profile. Contacts in connectors of the module are configured to facilitate sliding engagement. Male contacts are biased to protrude, but travel into connectors in which they are mounted during sliding until aligned with corresponding female contacts.

20 Claims, 6 Drawing Sheets

CONNECTING MULTIPLE CONDUITS

BACKGROUND

The present invention relates to connectors in computer hardware and, more specifically, to a modular system allowing easy reconfiguration of devices in a computing device.

In computing hardware, power, data, and other information must be conveyed between components. When components are on the same board, simple conductor paths may be employed, but it is often advantageous to use wires or cables for greater flexibility of configuration and/or easier replacement of components. Such wires or cables include connectors to enable communication between components, and when a component is added to a computing device, the component must be mounted or plugged into the device and whatever connectors the component requires must be mated with corresponding connectors in the computing device, which may be tedious.

SUMMARY

According to one embodiment of the invention disclosed herein, a connector system may include a first body with a first engagement surface configured to conform to a first profile, the profile having a first portion and a second portion. A second body may include a second engagement surface configured to conform to a second profile complementary to the first profile. The second profile may include a first portion complementary to the second portion of the first profile and a second portion complementary to the first portion of the first profile. A first contact may be mounted and biased so that at least a portion of the first contact extends away from the first engagement surface and is configured to travel toward the first engagement surface. A second contact configured to engage the first contact when the first engagement surface engages the second engagement surface and the first contact is aligned with the second contact may be mounted on the second engagement surface.

In another embodiment, a connector module may have a first group of connectors on a first portion of an engagement surface of the module, each connector including a plurality of contacts. A second group of connectors on a second portion of the engagement surface of the module may also each include a plurality of contacts. The first portion of the engagement surface and the second portion of the engagement surface may be arranged in one of a first profile or a second profile, the second profile being complementary to the first profile and configured so that a first module with the first profile may slidingly engage a second module with the second profile. Contacts included on the first profile may also be complementary to contacts included on the second profile.

Further, another embodiment may be implemented as a connector system including at least one first mounting rail and at least one second mounting rail. Each first mounting rail may include at least one first connector module, and each second mounting rail may include at least one second connector module complementary to the first connector module. A frame may bear a first mounting rail on an internal surface of a first frame side and a second mounting rail on an internal surface of an opposed frame side. At least one component may include a first mounting rail on a first external surface of the respective component and a second mounting rail on a second external surface of the respective component opposed to the first external surface. Each first mounting rail may be configured to slidingly engage a respective second mounting rail so that complementary connector modules are configured to slide into alignment, thereby mating connectors of complementary connector modules.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

According to embodiments of the invention disclosed herein, a modular connector system allows connecting of multiple conduits between computing device components simply by assembling or mounting the components, such as by placing the components in a server rack or other chassis. Sides of a computing device component may include connector modules laid out to complement each other so that one side of a computing device component complements what would be the equivalent of its opposite side on an adjacent computing device component. In embodiments, the opposed sides of the computing device components include profiles that permit assembly in only one orientation, thus ensuring mating or complementary connectors are properly aligned.

Figure 1:
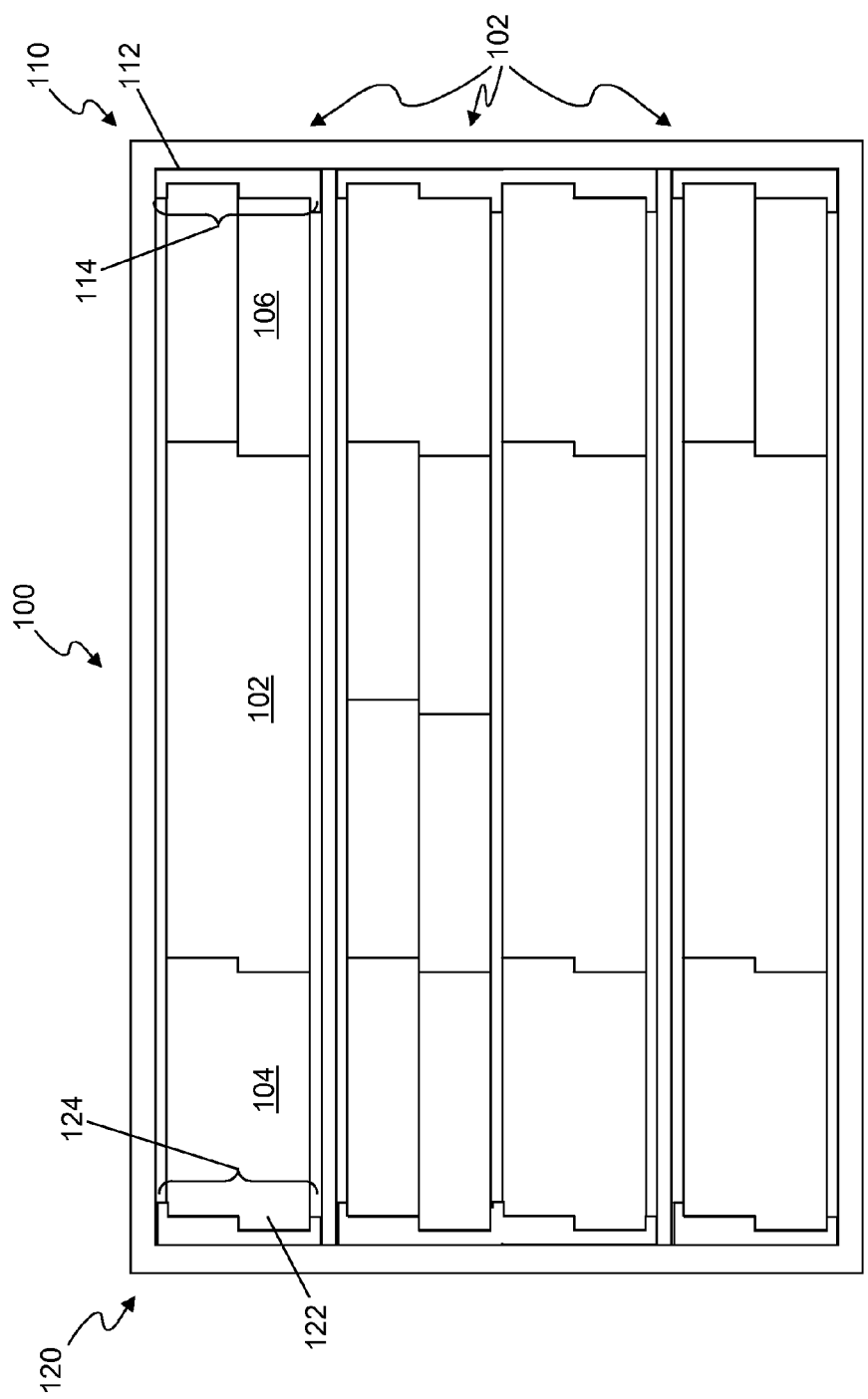
FIG. 1 is a schematic diagram of an implementation of a modular connector system according to an embodiment of the invention disclosed herein.

As seen in FIG. 1, a rack 100 may be configured to allow assembly of one or more computing devices 102 by mounting multiple computing device components, such as first component 104, second component 106, and third component 108. A first side 110 of rack 100 may include a first rail 112, while a second side 120 of rack 120 may include a second rail 122. In particular, first rail 112 may include a first profile 114 shaped to complement a second profile 124 of second side 122. Computing device components shaped to bear first and second profiles 114, 124 may then be mounted in first and second rails 112, 122 and engage each other to form a computing device 102.

Figure 2:
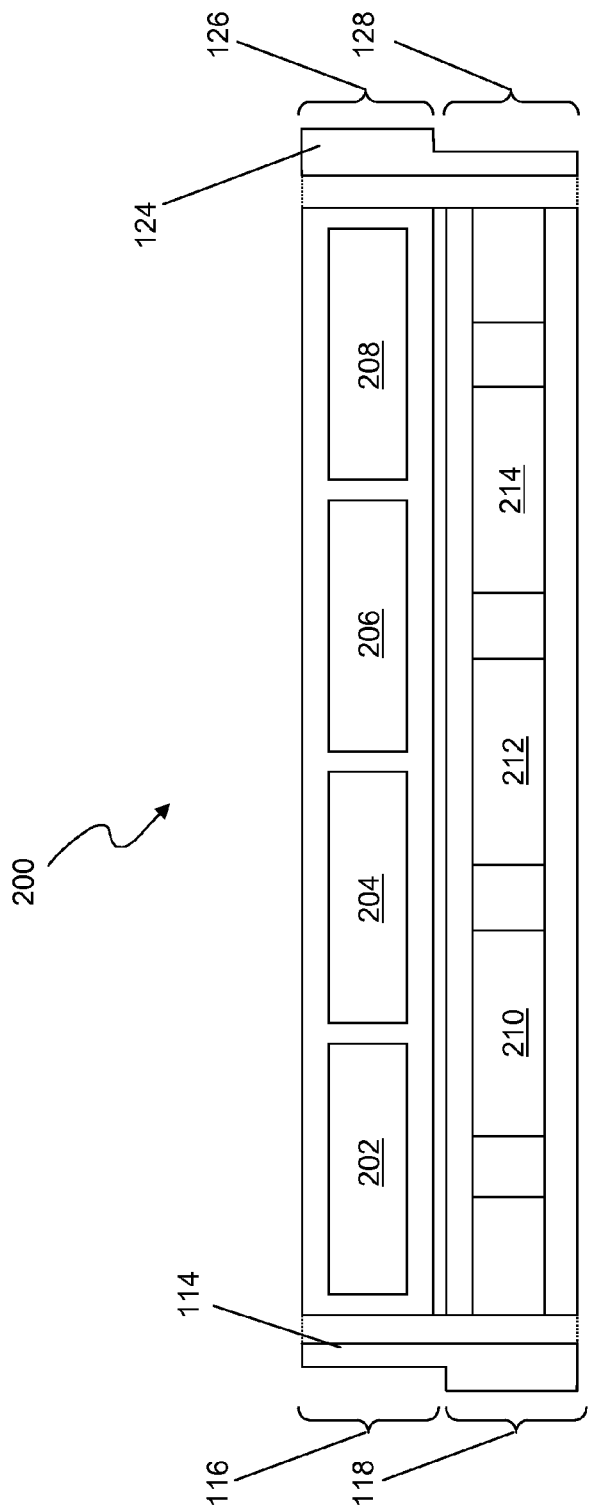
FIG. 2 is a schematic diagram of a connector module of a modular connector system according to an embodiment of the invention disclosed herein.

To enable connectivity between components, a connector module 200, an example of which is shown in FIG. 2, may be included on sides of the components and in first and second rails 112, 122. Connector module 200 may be configured to provide multiple connectors 202-214. For example, connector module 200 may include a first row 201 of first connectors 202-208 and a second row 203 of second connectors 210-214. While any type of connector might be included in either and/or both of first row 201 and second row 203, embodiments may be configured so that first connectors 202-208 may include a first type of connectors, such as input-output connectors, while second connectors 210-214 may include a second type of connectors, such as power connectors. For example, first connectors 202-208 could include, for example, parallel interface connector 202, IDE/PATA connector 204, SATA connector 206, and/or PCI connector 208, though other types of input/output connectors might be added or substituted for any of these as may be appropriate and/or desired. Similarly, second connectors 210-214 could include, for example, 120VAC connector 210, 12VDC connector 212, and/or 5VDC connector 214, though other types of connectors might be added or substituted for any of these as may be appropriate and/or desired. In embodiments, connector module 200 may be arranged on a side of a component so that first row 201 may lie on a first portion 116 of first profile 114, while second row 203 may lie on a second portion 118 of first profile 114.

Figure 3:
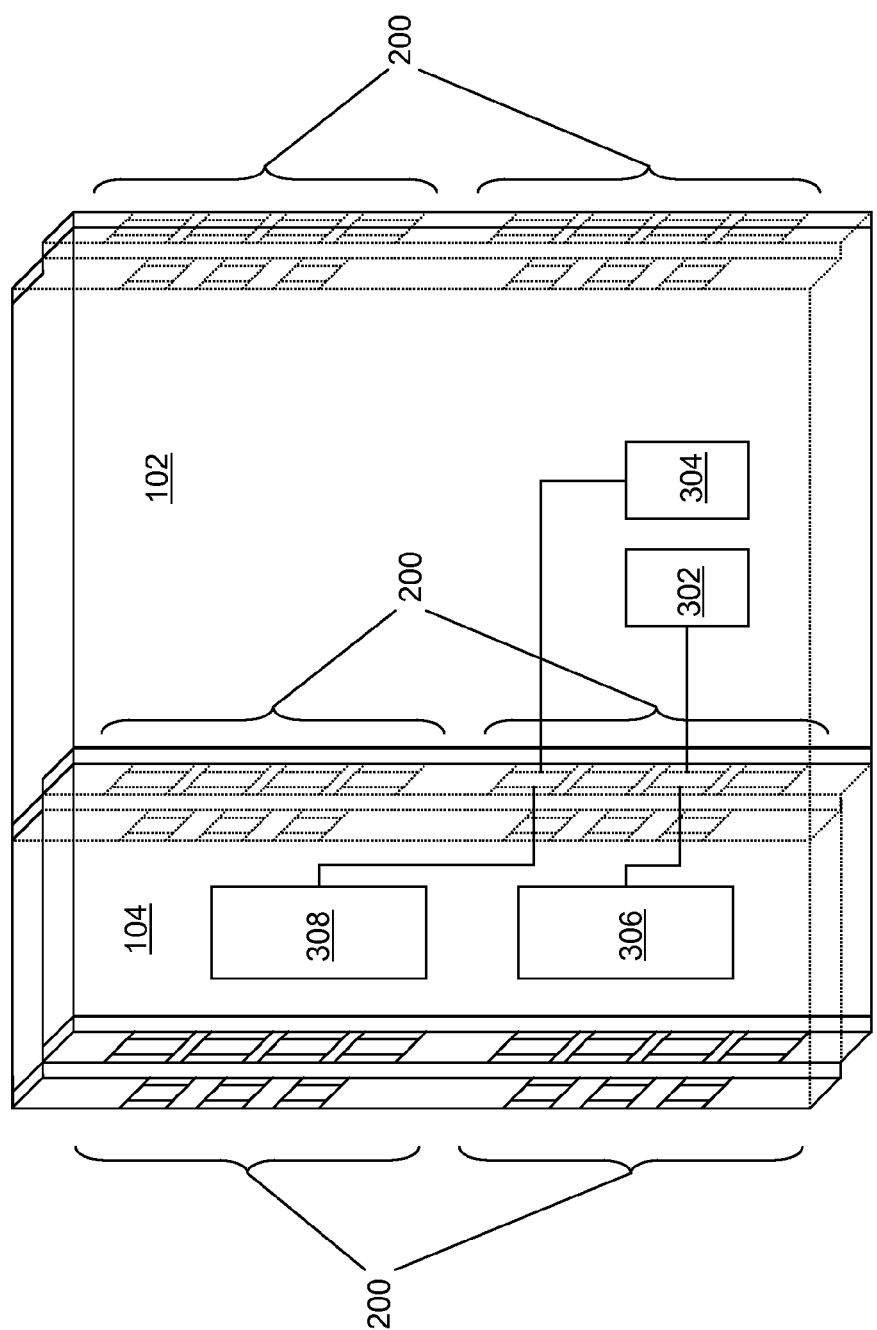
FIG. 3 is a schematic diagram of an arrangement of computing device components including an implementation of the modular connector system according to an embodiment of the invention.

Two computing device components 102, 104 from FIG. 1 are shown in FIG. 3 to illustrate deployment and use of connector modules 200. As seen in FIG. 3, each component 102, 104 includes connector modules 200 on opposed sides of components 102, 104. Multiple instances of connector module 200 may be included on a given side of a computing device component as may be needed and/or desired and/or appropriate. As seen in FIG. 3, connector modules 200 allow communication between first and second components 102, 104 via complementary connectors of a module 200 of first component 102 and a corresponding module 200 of second component 104. For example, first component 102 may have a first PCI bus 302 and a first SATA bus 304 to which a user might wish to connect devices, such as a first PCI device 306, such as a graphics processor, and a first SATA device 308, such as a mass storage device. Each of first PCI bus 302 and first SATA bus 304 may be connected to a respective connector of a module 200 of first component 102, and each of first OCI device 306 and first SATA device 308 may be connected to a respective complementary connector of a complementary module 200 of second component 104 so that first PCI device 306 is connected to first PCI bus 302 and first SATA device 308 is connected to first SATA bus 304.

Figure 4:
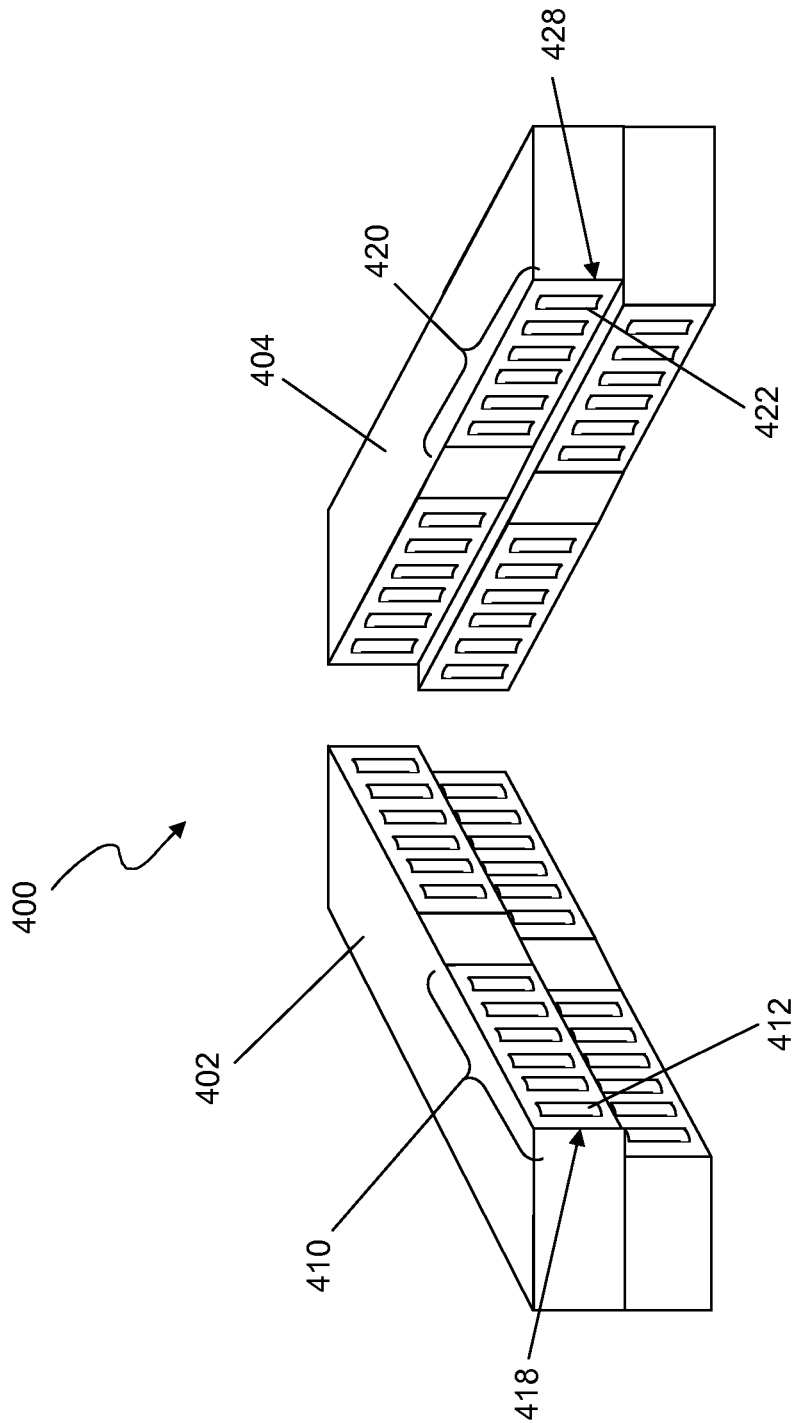
FIG. 4 is a schematic diagram illustrating contacts of complementary connector modules implemented according to an embodiment of the invention disclosed herein.
Figure 6:
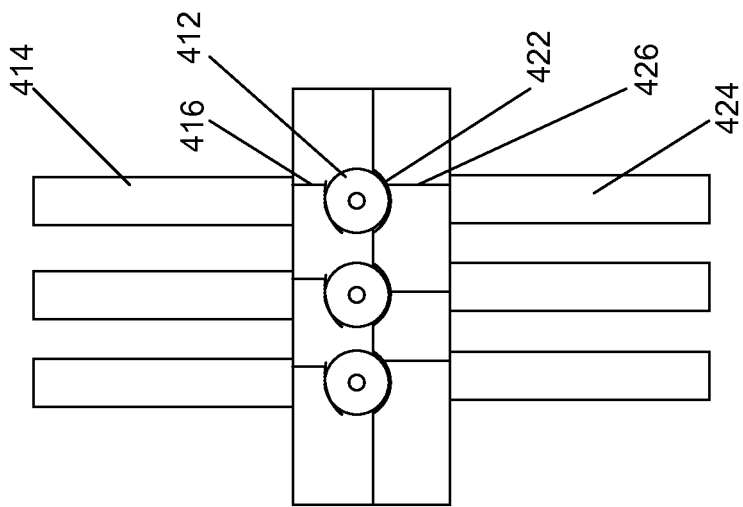
FIGS. 5 and 6 are schematic diagram illustrating contacts of the complementary connector modules of FIG. 4 respectively during and after mounting or assembly of computing device components implemented according to an embodiment of the invention disclosed herein.
Figure 5:
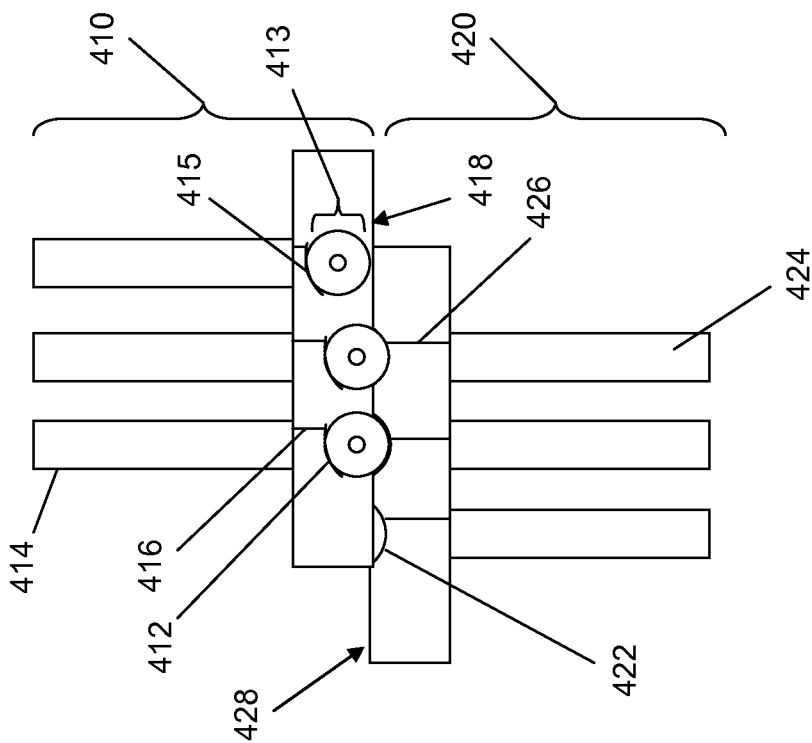

With reference to FIGS. 4-6, an example of a pair 400 of complementary connector modules according to an embodiment of the invention disclosed herein includes a first or male connector module 402 and a second or female connector module 404 complementary to first or male connector module 402. As can be seen in FIG. 4, first or male connector module 402 may include an engagement surface 418 configured to follow a profile, such as first profile 114, while second or female connector module 404 may include a second engagement surface 428 configured to conform to another profile, such as second profile 124. First or male connector module 402 may include a first or male connector 410 including a first or male contact 412. Similarly, second or female connector module 404 may include a second or female connector 420 including a second or female contact 422. In embodiments, first connector module 402 may serve as a body for first connector 410, and second connector module 404 may serve as a body for second connector 420.

Turning now to FIGS. 5 and 6, an example of a manner of sliding engagement of first and second connectors 410, 420 is illustrated, partially aligned or mated in FIG. 5 and fully aligned or mated in FIG. 6. Male contacts 412 of male connector 410 may each be connected to a respective male lead 414, such as via a respective conductor 416. Similarly, female contacts 422 of female connector 420 may each be connected to a respective female lead 424, such as via a respective conductor 426. In embodiments, male contacts 412 may protrude from male engagement surface 418, and female contacts 422 may extend into second engagement surface 428. One or both of male contacts 412 and female contacts 422 may be mounted for travel perpendicular to male engagement surface 418 and/or female engagement surface 428 so that travel-enabled contacts interfere less with sliding of engagement surfaces 418, 428 relative to each other during assembly. In addition, a travel-enabled contact may be shaped so that sliding motion of engagement surfaces 418, 428 relative to each other may force the travel-enabled contact into its respective engagement surface, though the travel-enabled contact may be act as a detent so that once a male contact 412 mates with a female contact 422, additional force is required to disengage mated contacts 412, 422 and slide engagement surfaces 418, 428 relative to each other.

More particularly, as seen in FIGS. 5 and 6, a male contact 412 may have a round cross-section 413 and be mounted so that less than half of cross-section 413 protrudes beyond first engagement surface 414. Lead 414 and/or conductor 416 may include a biasing portion 415, such as a spring. For example, male contact 412 may take the form of a ball detent including ball bearing spring biased to project from first engagement surface, a spring biasing the ball bearing also acting as a part of conductor 414. As an additional example, male contact 412 may take the form of a cylinder biased to protrude from first engagement surface 414. With a cylindrical male contact 412, ends of the cylinder may be mounted in slots, and bias may be provided by a portion of male conductor 414 of by an additional spring. A corresponding female contact 422 may simply be a depression in female engagement surface 428 lined with a conductive material and connected to a respective female conductor 424. However, in embodiments, a female contact 422 may be formed to enable travel transverse to female engagement surface 428, such as in a fashion similar to the examples of male contact 412 construction discussed above.

Figure 7:
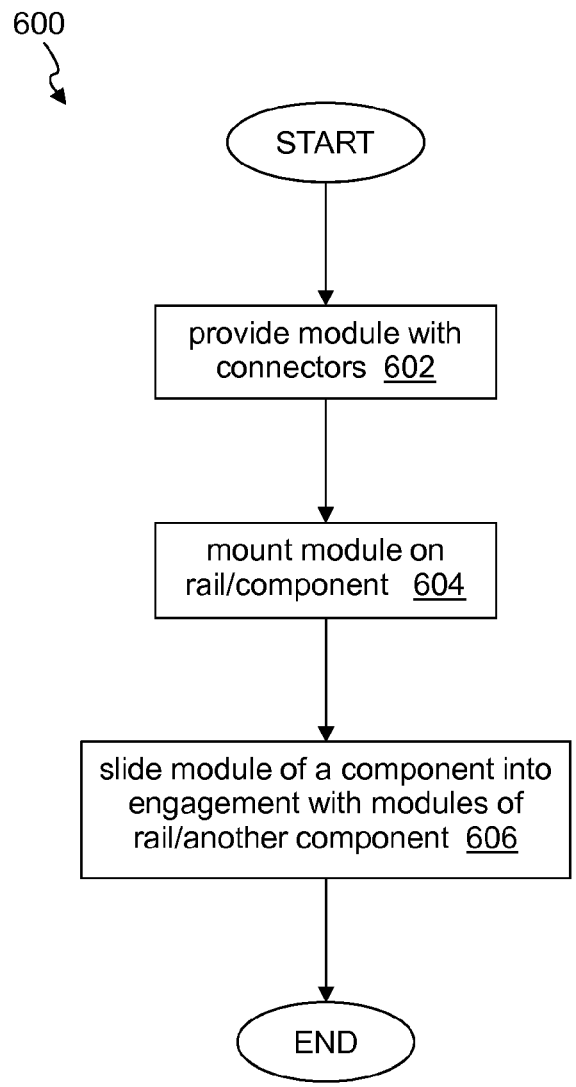
FIG. 7 is a schematic flow diagram of a method according to an embodiment of the invention disclosed herein.

FIG. 7 shows an example of a method of connecting multiple conduits 600 according to embodiments. A module with connectors may be provided (block 602), such as by providing a module connector 200. A module may be mounted on a rail or a component (block 604), and a module of a component or rail may be slid into engagement with a module of another component or rail (block 606). For example, referring to FIGS. 1-3, a module 200 may be provided in a first rail 112 of a rack 100, while a complementary module 200 may be provided in a side of a computing device component 104 so that the module 200 on the computing device 104 may slide into first rail 112 and into engagement with the module 200 of the first rail, thereby connecting components that are connected to the various connectors of the modules 200.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A connector system comprising:
    a first body including a first engagement surface, the first engagement surface being configured to conform to a first profile including a first portion and a second portion;
    a second body including a second engagement surface, the second engagement surface being configured to conform to a second profile complementary to the first profile, the second profile including a first portion complementary to the second portion of the first profile and a second portion complementary to the first portion of the first profile;
    a first contact mounted and biased so that at least a portion of the first contact extends away from the first engagement surface and is configured to travel toward the first engagement surface; and
    a second contact mounted on the second engagement surface and configured to engage the first contact when the first engagement surface engages the second engagement surface and the first contact is aligned with the second contact.

2. The module of claim 1, wherein the first contact is biased away from the first engagement surface by a first conductor connecting the first contact to a respective first lead.

3. The module of claim 2, wherein the first contact is mounted in the first body so that a portion of the first contact protrudes from the first engagement surface, the first contact being held in the first body by the first engagement surface.

4. The module of claim 3, wherein the first contact is a ball detent protruding from the first engagement surface, the first contact being biased and electrically connected to a first lead by a conductive spring.

5. The module of claim 3, wherein the first contact is a conductive cylinder mounted so that a longitudinal axis of the cylinder is substantially parallel to the first engagement surface and a portion of a cylindrical surface of the cylinder protrudes from the first engagement surface.

6. The module of claim 1, wherein the second contact is a conductive coating of a declivity in the second engagement surface configured to receive and engage the first contact, the conductive coating being electrically connected to a second lead via a second conductor.

7. The module of claim 6, wherein the second contact includes at least a portion of a spherical surface.

8. The module of claim 7, wherein the second contact includes at least a portion of a cylindrical surface.

9. A connector module comprising:
    a first group of connectors on a first portion of an engagement surface of the module, each connector including a plurality of contacts;
    a second group of connectors on a second portion of the engagement surface of the module, each connector including a plurality of contacts; and
    the first portion of the engagement surface and the second portion of the engagement surface being arranged in one of a first profile or a second profile, the second profile being complementary to the first profile and configured so that the first portion of the engagement surface of a first module with the first profile is arranged to slidingly engage the second portion of a facing engagement surface of a second module with the second profile, and contacts included on the first profile being complementary to contacts included on the second profile, the first and second portions of each engagement surface being substantially parallel to a direction of sliding.

10. The module of claim 9, wherein the first group of connectors includes a male connector with a first contact configured to travel into the module.

11. The module of claim 9, wherein the first contact is biased out of the module by a first conductor connecting the first contact to a respective first lead.

12. The module of claim 10, wherein the first contact is a ball detent electrically connected to a first lead.

13. The module of claim 10, wherein the first contact is a conductive cylinder mounted so that a longitudinal axis of the cylinder is substantially parallel to the first engagement surface.

14. The module of claim 9, wherein the second group of connectors includes a female connector with a second contact.

15. The module of claim 14, wherein the second contact is a conductive coating of a declivity in the second engagement surface, the conductive coating being electrically connected to a second lead via a second conductor.

16. The module of claim 15, wherein the second contact includes at least a portion of a spherical surface.

17. The module of claim 15, wherein the second contact includes at least a portion of a cylindrical surface.

18. A connector system comprising:
    at least one first mounting rail including at least one first connector module;
    at least one second mounting rail including at least one second connector module complementary to the first connector module;
    a frame bearing a first mounting rail on an internal surface of a first frame side and a second mounting rail on an internal surface of an opposed frame side;
    at least one component including a first mounting rail on a first external surface of the respective component and a second mounting rail on a second external surface of the respective component opposed to the first external surface; and
    each first mounting rail being configured to slidingly engage a respective second mounting rail so that complementary connector modules are configured to slide into alignment, thereby mating connectors of complementary connector modules, each first and second mounting rail extending substantially parallel to a direction of sliding, each first connector module being arranged along a respective mounting rail to face substantially perpendicular to the direction of sliding and to face a respective second connector module, and each second connector module being arranged along a respective mounting rail to face substantially perpendicular to the direction of sliding and to face a respective first connector module.

19. The system of claim 18, wherein each connector module includes:
- a first group of connectors on a first portion of an engagement surface of the module, each connector including a plurality of contacts;
- a second group of connectors on a second portion of the engagement surface of the module, each connector including a plurality of contacts; and
- the first portion of the engagement surface and the second portion of the engagement surface being arranged in one of a first profile or a second profile, the second profile being complementary to the first profile and configured so that a first module with the first profile is configured to slidingly engage a second module with the second profile, and contacts included on the first profile being complementary to contacts included on the second profile.

20. A connector system comprising:
- at least one first mounting rail including at least one first connector module;
- at least one second mounting rail including at least one second connector module complementary to the first connector module;
- a frame bearing a first mounting rail on an internal surface of a first frame side and a second mounting rail on an internal surface of an opposed frame side;
- each first connector module and each second connector module including a first group of connectors on a first portion of an engagement surface of the module, a second group of connectors on a second portion of the engagement surface of the module, each connector including a plurality of contacts, and the first portion of the engagement surface and the second portion of the engagement surface being arranged in one of a first profile or a second profile, the second profile being complementary to the first profile and configured so that a first module with the first profile is configured to slidingly engage a second module with the second profile, and contacts included on the first profile being complementary to contacts included on the second profile;
- at least one component including a first mounting rail on a first external surface of the respective component and a second mounting rail on a second external surface of the respective component opposed to the first external surface; and
- each first mounting rail being configured to slidingly engage a respective second mounting rail so that complementary connector modules are configured to slide into alignment, thereby mating connectors of complementary connector modules, wherein each connector module further comprises one of a first contact and a second contact, and wherein:
  - the first contact is mounted and biased so that at least a portion of the first contact extends away from the first engagement surface and is configured to travel toward the first engagement surface; and
  - the second contact is mounted on the second engagement surface and is configured to engage the first contact when the first engagement surface engages the second engagement surface and the first contact is aligned with the second contact.

\* \* \* \* \*